United States Patent [19]

Lachman et al.

[11] Patent Number: 4,631,268

[45] Date of Patent: Dec. 23, 1986

[54] PREPARATION OF MONOLITHIC CATALYST SUPPORT STRUCTURES HAVING AN INTEGRATED HIGH SURFACE AREA PHASE

[75] Inventors: Irwin M. Lachman; Pronob Bardhan; Lawrence A. Nordlie, all of Corning, N.Y.

[73] Assignee: Corning Glass Works, Corning, N.Y.

[21] Appl. No.: 712,875

[22] Filed: Mar. 18, 1985

[51] Int. Cl.$^4$ .................. B01J 20/28; B01J 35/00
[52] U.S. Cl. .................. 502/439; 502/64; 502/263; 502/302; 502/324; 502/355; 502/524; 502/527
[58] Field of Search .......... 502/527, 302, 439, 64, 502/263, 324, 355, 524

[56] References Cited

U.S. PATENT DOCUMENTS

| | | | |
|---|---|---|---|
| 2,742,437 | 4/1956 | Houdry | 252/455 |
| 3,824,196 | 7/1974 | Benbow et al. | 252/455 R |
| 4,007,134 | 2/1977 | Liepa et al. | 252/455 Z |
| 4,157,375 | 6/1979 | Brown et al. | 423/212 |
| 4,239,656 | 12/1980 | Fujitani et al. | 252/463 |
| 4,277,376 | 7/1981 | Paolasini | 252/455 R |
| 4,294,806 | 10/1981 | Abe et al. | 423/210 |
| 4,448,833 | 5/1984 | Yamaguchi et al. | 502/527 X |
| 4,451,517 | 5/1984 | Inoguchi et al. | 502/527 X |

FOREIGN PATENT DOCUMENTS

| | | |
|---|---|---|
| 1442653 | 8/1969 | Fed. Rep. of Germany . |
| 1064018 | 4/1967 | United Kingdom . |
| 1142800 | 2/1969 | United Kingdom . |

*Primary Examiner*—Carl F. Dees
*Attorney, Agent, or Firm*—R. N. Wardell; G. H. Levin

[57] ABSTRACT

A method of forming a monolithic ceramic catalyst support having a high surface area phase of porous oxide embedded within the monolith structure is provided. The porous oxide phase is incorporated into a sinterable ceramic structure as a discrete discontinuous phase. The high surface area necessary for effective catalyst support is thereby provided within the ceramic structure, which is sintered to provide appreciable density and strength.

21 Claims, 3 Drawing Figures

PREPARATION OF MONOLITHIC CATALYST SUPPORT STRUCTURES HAVING AN INTEGRATED HIGH SURFACE AREA PHASE

BACKGROUND OF THE INVENTION

This invention is directed to monolithic ceramic catalyst supports and particularly to honeycomb supports which contain a discrete high surface phase incorporated within the ceramic matrix The conventional ceramic monolithic catalyst consists of a ceramic support with a coating of high surface material upon which the catalyst is actually deposited. In particular, the ceramic support is normally prepared by first sintering a mold of clay or other ceramic material at a high temperature to impart density and strength. This procedure normally results in the ceramic's having a very small surface area, and consequently the ceramic must be coated with another material having a higher surface area, as well as specific chemical characteristics, on which to actually deposit the catalyst. This procedure of depositing a high surface area "wash coat" on the low surface area ceramic wall is disclosed, for example, in U.S. Pat. Nos. 2,742,437 and 3,824,196.

Catalyst supports of this kind suffer from several disadvantages. In service, the supports are exposed to a flow of gases which often contain dusts or particulate matter, which can cause the high surface area coating to flake off the underlying ceramic support. This phenomenon can also occur where the support is exposed to thermal cycling because the wash coat and the underlying ceramic material often have different thermal expansion coefficients. Furthermore, catalysts deposited on the high surface area wash coat are susceptible to poisoning, such as by lead or phosphorous in service in automobile converters, and therefore must be periodically regenerated or replaced. It is therefore an object of the present invention to provide a monolithic support having a high surface area which is not easily abraded and which supports catalysts in a manner that resists poisoning. It is a further object of the invention to provide a monolithic support which has good mechanical properties while retaining the porosity and high surface area necessary for proper catalytic functioning. These and other objects are met by the invention to be described.

SUMMARY OF THE INVENTION

The present invention provides a method of preparing a monolithic support for a catalyst having a first substantially continous ceramic matrix phase and a second discontinuous high surface area support phase embedded in the first phase. The method comprises (a) providing multiple matrix bodies of a sinterable ceramic material and a plasticizing/binding agent for the ceramic; (b) providing multiple support bodies of (i) a porous oxide having a surface area of at least 20 m²/g selected from the group consisting of alumina, silica, spinel, titania, zeolite, zirconia, and mixtures of these; and (ii) a plasticizing/binding agent for the oxide; (c) intermingling the matrix bodies and support bodies to form a composite thereof wherein the ratio of matrix bodies to support bodies is at least 1.3:1 and wherein the support bodies are substantially uniformly distributed through the composite; (d) passing the composite body through a die to form a desired monolith shape thereof; and (e) heating the monolith shape to sinter the ceramic material therein.

The monolithic support prepared in this manner contains a ceramic matrix sintered to a desirable level of strength, and a discontinuous, but discrete, phase of porous oxide integrated within the ceramic matrix to provide the high surface area to support catalyst. It has been recognized that the ceramic, although sintered, is itself porous and that the high surface-area oxide material, even though within the walls of the ceramic, is accessible to the target gas stream and provides suitable surface area and extended catalyst life. Since the high surface area material (upon which catalytically active materials are deposited) is embedded within the honeycomb's walls, it either will be fully buried, and therefore be completely protected from abrasion, or will form a substantial portion of the honeycomb wall itself, and be too deep to completely flake off. Furthermore, to the extent the high surface area material is fully embedded, the ceramic acts as a filter, it is thought, to eliminate or bind poisons before they can contact and adversely affect the catalyst itself. Another advantage of the monolithic supports of this invention, compared to those heretofore used, is the lower weight attributable to replacement of the denser ceramic material with the lighter high surface area oxide phase. In those applications requiring the catalyst to be thermally activated and to function rapidly, such as in automotive catalytic convertors, the reduced thermal mass in the present monolith permits the "light off" temperature to be reached more quickly.

DETAILED DESCRIPTION OF THE INVENTION

Figure 1:
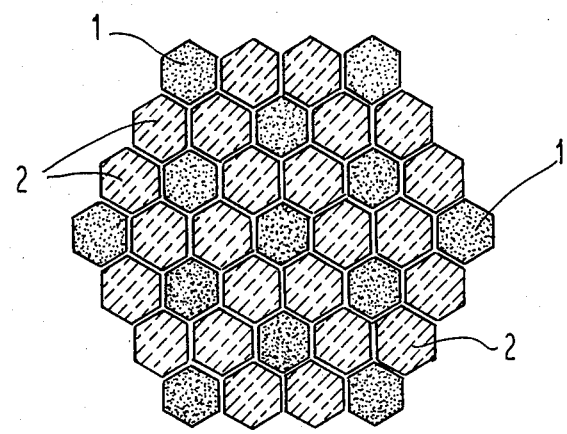
FIG. 1 depicts a cross-section of a composite of the elongate matrix bodies and support bodies, showing the spatial relationship of the bodies.

The method of the present invention contemplates the initial, separate, formation of moldable bodies of the materials for each of the two phases that will constitute the monolithic support. More particularly, a moldable composition of a high surface area oxide and a plasticizing/binding agent for the oxide, as the support phase, is prepared separately from a second moldable composition of a sinterable ceramic material and a plasticizing/binding agent for the ceramic, as the matrix phase. Moldability is important to the practice of the invention because, as will be discussed more fully below, each composition is formed into shapes which are then intermingled for subsequent extrusion though a die to form the monolithic supports of the invention.

The porous oxides suitable for use as the support phase material herein are those which, after calcining, have a surface area of at least 20 square meters per gram, preferably at least 60 square meters per gram, and most preferably at least 100 square meters per gram. (As used herein "calcining" means heating a material to a temperature sufficiently high to substantially eliminate any volatiles but below that at which the material begins to lose substantial porosity and surface area.) Preferably, the oxide is alumina, silica, a spinel, titania, zirconia, or a zeolite. Mixtures of the oxides can also be used. The invention is not limited to these particular oxides, however, and as those skilled in the art will recognize, the invention contemplates the use of other materials which are commonly used as catalyst supports and which have the above-described characteristics.

The aluminas useful in the preparation of the high surface area support phase of this invention are those which, upon calcining, provide gamma-alumina or other transition aluminas having the specified surface area. Colloidal gamma-alumina can be used directly, or "alumina-precursors" such as alpha-alumina monohydrate, or aluminum chlorohydrate can also be used. When alpha-alumina monohydrate is used, the particle size can be from less than 1 micron up to about 100 microns. Suitable commercially available materials of this kind are Kaiser SA substrate alumina, available from the Kaiser Chemical Division of Kaiser Aluminum Corporation, and the Catapal ® aluminas available from the chemical division of Conoco Corporation. The colloidal gamma-alumina is generally in the form of particles not exceedinq 1 micron, but size is not critical. The aluminum chlorohydrate is generally in the form of an aqueous solution of aluminum chloride, preferably with an alumina content of at least 20% by weight. Suitable products of this kind are the Chlorohydrol ®, Rehydrol ®, and Rehabond ® alumina products available from Reheis Chemical Company.

Spinels useful in the present invention are the magnesium aluminate spinels heretofore used as catalyst supports, including spinel solid solutions in which magnesium is partially replaced by such other metals as manganese, cobalt, zirconium, or zinc. Preferred spinels are magnesium aluminate spinels having 1-7 percent by weight alumina in excess of 1:1 MgO.Al$_2$O$_3$ spinel; that is, those having about 72.0-73.5 weight percent Al$_2$O$_3$ (balance MgO). Spinels of this kind are available on order from Biakowski International Corporation, or can be prepared by co-precipitation or wet-mixing precursor powders of alumina and magnesia, followed by drying and calcining. Such a prodedure is described in U.S. Pat. No. 4,239,656, the disclosure of which is hereby incorporated by reference. As a supplement to this disclosure, however, it has been found that calcining of the spinels should normally not exceed 1300° C. for 2-2.5 hours. Calcining temperatures below 1200° C. are preferred. Suitable alumina precursor powders for preparation of the spinels are commercially available as Kaiser SA hydrated alumina or Conoco Catapal SB alumina (boehmite alpha-alumina monohydrate). Magnesium oxide component powders found to be suitable are magnesium hydroxide slurry, about 40 weight percent MgO, available from Dow Chemical Company, or hydrated magnesium carbonate.

High surface area silica that can be used in preparing the high surface area composition for the support phase are the amorphous silicas of about 1-10 microns or sub-micron particle size such as Cabosil ® EH-5 colloidal silica, available from Cabot Corporation. Silica precursors, such as an aqueous suspension of a colloidal silicate, can also be used. High surface area titanias suitable for use in the high surface area support phase are also commercially available, such as P25 TiO2 available from DeGussa Corporation. Titania precursors such as hydrolyzed titanium isopropoxide can also be used.

The use of zeolites to provide high surface area in various catalytic and molecular sieving operations is well known. Readily-available zeolites useful in the present invention include the crystalline aluminosilicate zeolites with the art-recognized designations A, X, and Y, and silicalite. Zeolites A, X, and Y, and their methods of preparation, are disclosed in U.S. Pat. Nos. 2,882,243; 2,882,244; and 3,130,007, respectively. The disclosures of these patents are incorporated by reference. Silicalite is described in NATURE (Vol. 271), No. 5645 (1978).

Composites of alumina and silica also can form the basis for the high surface area phase. Alumina-silica composites are commercially available from Davison Chemical Division of W. R. Grace and Company and from the Norton Company, or can be prepared by the gel processes as described, for example, in U.S. Pat. Nos. 4,129,522 and 4,039,474. Alternatively, alumina and silica or their precursors can be mixed directly during the preparation of the support composition as described below.

When the high surface area material is an alumina, spinel, or a mixture of alumina and silica, it is preferred to add up to about 20 percent by weight (based on the alumina, spinel, or alumina-silica mixture weight) of a rare earth oxide. The preferred rare earth oxides are those of the "cerium subgroup", that is, elements of atomic number 57-62, particularly cerium and lanthanum. Cerium oxide is most preferred. Particularly useful spinels, for example, are those in which about 1 to 20 percent by weight, based on the total spinel weight, of cerium oxide is present. Cerium oxide is incorporated by adding, for example, cerium acetate, cerium carbonate, or cerium nitrate to the other precursor powders during the spinel preparation. In like manner, particularly useful mixtures of alumina and silica are those in which about 5 percent by weight, based on the total alumina and silica dry weight, of cerium oxide is present.

The preferred porous oxides for use in the high surface area support phase are the magnesium aluminate spinels, as described above, the transition aluminas, particularly, gamma-alumina, and mixtures of 50-93 weight percent alumina and 7-50 weight percent silica, both on a dry calcined basis.

The ceramic material which is the basis for the matrix phase of the monolith can be any of the well-known sinterable materials capable of providing mechanical strength and good thermal properties in the monolithic supports as heretofore prepared by those skilled in the art. Preferably the ceramic is selected from cordierte, mullite, talc, clay, zirconia, zirconia-spinel, lithium aluminosilicates, alumina, silica, and alumina-zirconia composites. Mixtures of these can also be used to the extent that the chosen materials are compatible and will not degrade each other, as those skilled in the art will recognize.

Unless otherwise described, the ceramic materials mentioned above are in their commonly utilized form. For purposes of this invention, however, particular points about the ceramic materials should be noted. Cordierite, although it can be in the precursor or "raw" form which becomes true cordierite upon heating, is preferably pre-reacted. When raw cordierite is used, it is preferred that up to 10% by total weight of B$_2$O$_3$ be added to the raw batch to initiate cordierite formation at lower than usual temperatures and to impart additional strength. The zirconia-based ceramics used in the present invention are preferably those made directly from baddeleyite ore concentrates, as described in U.S.

Pat. No. 4,461,843 to McGarry et al, but can be prepared by any conventional methods. The alumina-zirconia composites useful as the ceramic in this invention are preferably those based on alpha-alumina and monoclinic zirconia, having 2–50 percent bv weight zirconia. These composites can be prepared by methods known in the art. The preferred clay is kaolin. The most preferred ceramic materials for use are pre-reacted cordierite or mullite, which may be microcracked as discussed below.

The ceramic material can contain substantial amounts of a component which causes intracrystalline and intercrystalline microcracking to occur. Such microcracking enhances the thermal shock resistance of monolithic supports based on these ceramics and is therefore desirable when the monoliths, in service, may be exposed to rapid changes in temperature. Ceramic materials which contain such a component, and are therefore contemplated for use within the present invention are disclosed in U.S. Pat. Nos. 3,528,831; 3,549,400; and 3,578,471; all issued to I. M. Lachman. A preferred microcracking agent for addition to the ceramic material is aluminum titanate, which is normally incorporated into the ceramic matrix as a "solid solution" with the basic ceramic material. An aluminum titanate solid solution with mullite is disclosed in U.S. Pat. No. 4,483,944 to Day, et al. The disclosures of the four above-mehtioned patents are incorporated herein by reference.

The ceramic material should be in particulate form preferably of a size finer than 200 mesh (U.S. Standard) and more preferably finer than 325 mesh (U.S. Standard). With such characteristics, the ceramic material can be more easily sintered, during the subsequent formation of the monolith, at temperatures below those at which the surface area of the porous oxide support phase would be adversely effected.

The high surface material and ceramic matrix material are separately formed into moldable bodies by mixing the constitutent materials with an additional substance that binds those materials into a plasticized mass. This plasticizing/binding agent, which can be the same for each of the two kinds of bodies, can be any of the well-known materials commonly used in the ceramic art for such purposes. Suitable plasticizing/binding agents are disclosed in:

"Ceramics Processing Before Firing," ed. by George Y. Onoda, Jr. & L. L. Hench, John Wiley & Sons, New York "Study of Several Groups of Organic Binders Under Low-Pressure Extrusion," C. C. Treischel & E. W. Emrich, *Jour. Am. Cer. Soc.*, (29), pp. 129–132, 1946

"Organic (Temporary) Binders for Ceramic Systems,"S. Levine, *Ceramic Age*, (75) No. 1, pp. 39+, January 1960

"Temporary Organic Binders for Ceramic Systems,"S. Levine, *Ceramic Age*, (75) No. 2, pp. 25+, February 1960

Preferred agents are methyl cellulose, polyvinyl alcohol, or a silicon resin. The silicon resins preferred for use are described in U.S. Pat. No. 3,090,691 to Weyer. The most preferred binder is methyl cellulose, available as Methocel A4M from the Dow Chemical Company.

The constituent materials (high surface area porous oxide for the support bodies; ceramic material for the matrix bodies) are separately mixed with sufficient plasticizing/binding agent to form a moldable mass. Generally, about 1–20 percent by weight, based on the porous oxide or ceramic material weight, of the plasticing/binding agent is used. Up to about 1 percent by weight, based upon the total body weight, of surfactant or lubricant such as sodium stearate can also be used to facilate mixing. The mixing step should be performed in a liquid, preferably water, which acts as a further plasticizer. When the plasticizing/binding agent is a silicone resin, it is preferred to use isopropyl alcohol in addition to water. Conventional mixing equipment can be used, but the use of a mix muller is preferred.

According to the present method, the plasticized masses of high surface area support material and those of ceramic matrix material are separately molded or formed into discrete bodies and intermingled for coextrusion through a die to form the final desired shape of the monolithic catalyst support. The method of this invention is particularly well suited to the formation of honeycomb supports. Normally, the support bodies and matrix bodies will be intermingled to form a composite body thereof in which the support bodies constitute a distinct, preferably discontinuous, phase throughout. The support bodies should also be uniformly or substantially uniformly distributed throughout the composite. To provide the proper distribution, there will normally be a ratio of matrix bodies to support bodies of at least about 1.3:1, preferably at least 1.5:1. It is preferred, that the size and shape of the matrix bodies and support bodies be about the same. Following this and the above-mentioned ratios, the monoliths formed from such a composite will contain, as is preferred, about 10–40 percent by weight of the high surface phase.

The composite can be of any size or shape so long as the support bodies are uniformly or substantially uniformly distributed throughout and are present therein in a distinct phase and so long as the composite can be extruded through a die to form the final monolith shape. It is also to be understood that the manner of forming the composite can be by any means by which these criteria are substantially meant. For example, matrix bodies and support bodies can be molded together into a composite in the shape of a sausage or sphere which is then extruded into the final monolith shape. It is also possible to intermingle the support bodies and matrix bodies directly in the inlet barrel of the extruder, thus forming a composite which can be immediately extruded thereafter.

In a preferred embodiment of the present method, the plasticized masses of high surface area material and those of ceramic material are separately extruded through a die into elongated shapes, preferably of rectangular, hexagonal, or circular cross-section. Preferably, the diameters of circular cross-section are about 0.25–0.5 inch for the matrix bodies and about 0.06–0.1 inch for the support bodies. For square cross-sections, preferably the length of a side is about 0.06–0.5 inch for the matrix bodies and the support bodies; and for hexagonal cross-sections, the length of the side is preferably about 0.15–0.4 inch for both kinds of bodies. Most preferably, both the support bodies and matrix bodies are extruded as rods having an hexagonal cross-section with about 0.25-inch sides.

The extruded bodies are then assembled into a single composite body by intermingling the rods axially or longitudinally. Most preferably, this will be done so that the rods are substantially parallel. The support bodies are positioned to be uniformly or substantially uniformly distributed through the composite. To provide the proper distribution, there will normally be a ratio of matrix bodies to support bodies of at least 1.5:1, preferably at least about 2:1 in the composite. After firing, monoliths formed from such a composite will contain, as is preferable, about 10–40 percent by weight of the high surface phase.

As an example, FIG. 1 depicts the cross-section of a composite of hexagonal rods of the two phases of materials. High surface area support bodies 1 are uniformly distributed among the more numerous ceramic matrix bodies 2. Each high surface area support body is at least partially encased by the matrix bodies.

Figure 2:
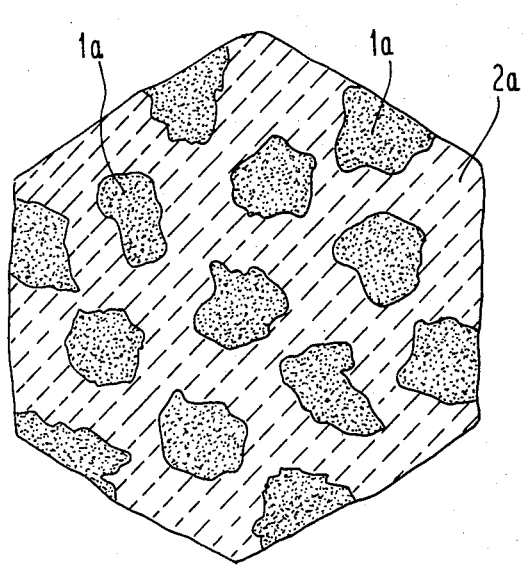
FIG. 2 is a magnified cross-sectional depiction of the composite after extrusion through a rod die.

The composite so formed is then itself preferably extruded through a rod die one or more times to reduce its own cross-sectional area and that of the high surface support phase embedded therein, and to effect further distribution of the high surface phase throughout the ceramic matrix phase. It is most preferred that extrusion be performed in a die that reduces the size of the cross-sectional area of the composite itself to that of one of the original constituent rods. In this manner, the largest cross-sectional dimension of the high surface phase within the composite will be, as is preferred, smaller than the wall thickness of the final monolith shape into which the composite is ultimately extruded. FIG. 2 depicts the composite of FIG. 1 after a single extrusion through a hexagonal rod die. Integrity of the original assembly has been retained. The high surface area bodies 1a are embedded in a substantially continuous phase formed of the ceramic matrix bodies 2a.

Figure 3:
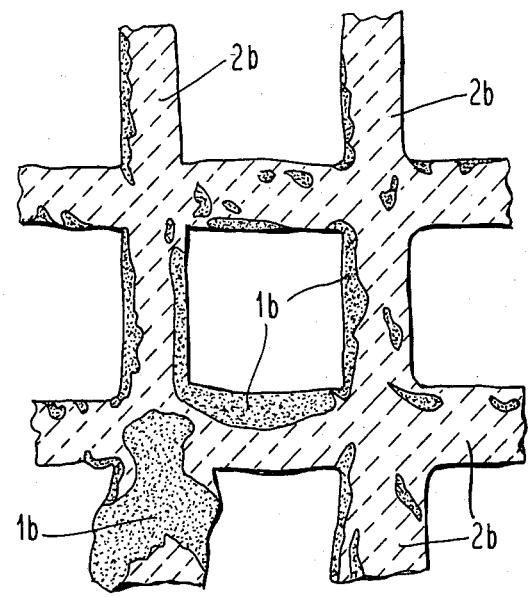
FIG. 3 is a magnified view of a portion of the walls of a honeycomb structure showing the support phase embedded within the ceramic structure of the walls.

Ultimately, the composite is extruded through a die to form the desired shape of the final monolith. FIG. 3 shows an enlarged portion of a honeycomb monolith formed by the extrusion of a composite as described above. The discontinuous portions 1b of the high surface area phase are completely or substantially embedded within the ceramic matrix phase 2b which constitutes the major portion of the wall structure. Typical honeycomb monoliths, for example, have 400 square cells per square inch with a wall thickness of 7 mils, or as another example, have 200 square cells per square inch with a wall thickness of 20 mils.

The monolith shapes are heated to a temperature and for a time sufficient to sinter the ceramic material. Optionally, this heating/sintering step is preceeded by drying the shapes at about 100°–120° C. The heating/sintering step generally takes place at 800°–1200° C., although when silicone resin is used as a binder for the ceramic matrix, particularly when the ceramic has a high alumina content, temperatures as low as 500° C. may be sufficient. Preferably, the temperature of the sintering step does not exceed about 1100°–1150° C. Despite the temperatures used to sinter the ceramic, the embedded porous oxide support phase retains high surface area and preferably provides the monolithic support with an overall surface area of at least 8–10 $m^2/g$, more preferably at least 15–20 $m^2/g$ The monolithic supports of this invention may have some catalytic activity of their own by virtue of the chemistry and structure of the high surface area phase. The support may further carry additional catalytically active ingredients dispersed throughout, but generally more concentrated at the high surface area sites provided by the embedded porous oxide support phase. These additional catalytic ingredients can be incorporated into the monolith by methods known in the art. Preferably, these ingredients will be deposited onto the support bodies after fabricating and sintering the final structure.

The monolithic supports of this invention are useful in most applications in which it is necessary to catalytically convert undesirable components in a gas stream prior to the stream's further processing or exhaustion to the atmosphere. The supports have good thermal shock resistance, particularly when the ceramic matrix phase is microcracked, and are therefore useful in applications in which they might be exposed to rapid and frequent changes in temperature. Capability to withstand thermal shock makes the supports of this invention particularly well-suited for catalyzing the conversion of truck and automotive exhause gases to less noxious forms.

Aspects of the invention are illustrated, but not limited by, the following examples:

EXAMPLES 1–4

In the Examples 1–4 to follow, the materials indicated in the table were used to form the ceramic matrix bodies and the high surface area support bodies.

| EXAMPLE | Ceramic Material | High Surface Area Material |
| --- | --- | --- |
| 1 | Manganese cordierite solid solution (raw batch; 48.0% $SiO_2$, 32.6% $Al_2O_3$, 5.80% MgO, 13.6% MnO) | 1:1.08 MgO:$Al_2O_3$ spinel formulation (not calcined) made from Kaiser SA alumina and Baker reagent basic magnesium carbonate (provides 6% excess $Al_2O_3$ over 1:1 after calcining). |
| 2 | Manganese cordierite solid solution (raw batch; 48.0% $SiO_2$ 32.6% $Al_2O_3$, 5.80% MgO, 13.6% MnO) | MgO:$Al_2O_3$ spinel-(4% excess $Al_2O_3$ over 1:1, 72.75% $Al_2O_3$) Surface Area 33 $m^2/g$, Biakowski International Corp. |
| 3 | Pre-reacted cordierite | MgO:$Al_2O_3$ spinel-(4% excess $Al_2O_3$ over 1:1, 72.75% $Al_2O_3$) Surface Area 33 $m^2/g$, Biakowski International Corp. |
| 4 | Pre-reacted cordierite, particle size finer than 200 mesh | Alumina-silica mixture (3:1 mole ratio-dry basis) using Kaiser SA alumina and CABOSIL EH-5 silica |

The high surface area material and ceramic material for each example were mixed separately in a mix muller with an additional 6% by weight of Methocel ® A4M methyl cellulose and 0.5% by weight of sodium stearate as lubricant. Distilled water was added to further plasticize the mass. The two mixtures of each example were extruded separately through a noddle die and then, still segregated, through a hexagonal die, to form rods having a hexagonal cross-section with 0.25-inch sides.

For each example, the extruded rods were assembled in a jig in the form of a single composite hexagon, using 24 ceramic material rods and 13 high surface area rods. The composites were extruded several times through a hexagonal rod die to reduce the cross-sectional area of the high surface area phase and to distribute it through the ceramic material phase. The composites were then extruded through a honeycomb die. The composites of Examples 1–3 were extruded to produce honeycomb shapes havinq 200 square openings per square inch with a wall thickness of 12 mils. The composite of Example 4 was extruded to produce a honeycomb shape having 400 square openings per square inch with a wall thickness of 7 mils.

The honeycomb shapes of each example were wrapped in aluminum foil and steam dried at 110° C. for 16 hours, and then heated at various temperatures for either 4 or 6 hours to sinter the ceramic matrix phase. Hexagonal rods of the high surface area support material of Examples 1, 3 and 4 (the support phase of Example 2 was the same as that of Example 3) were also heated under similar conditions so that their separate characteristics could be ascertained. The surface areas of the honeycomb monoliths and the rods, according to heating temperature and time, are shown in the following Table.

|  | Heating Infor. °C./hours | BET Surface Area (m²/g) | Remarks |
| --- | --- | --- | --- |
| Example 1 |  |  |  |
| honeycomb | 1000/6 | 17.8 | no cordierite formed |
|  | 1100/6 | 6.6 | incomplete cordierite formation |
|  | 1150/6 | 5.7 | cordierite & spinel |
|  | 1200/6 | 4.9 | cordierite & spinel |
|  | 1250/6 | 0.5 | cordierite & spinel |
| spinel rods | 1000/6 | 75.6 | partial spinel |
|  | 1100/6 | 47.2 | partial spinel |
|  | 1150/6 | 34.1 | partial spinel |
|  | 1200/6 | 21.8 |  |
|  | 1250/6 | 16.3 |  |
|  | 1300/6 | 6.7 |  |
| Example 2 |  |  |  |
| honeycomb | 1000/6 | 12.0 |  |
|  | 1150/6 | 6.2 | cordierite & spinel |
|  | 1200/6 | 4.5 | cordierite & spinel |
|  | 1250/6 | 2.4 | cordierite & spinel |
| Example 3 |  |  |  |
| honeycomb | 1000/6 | 11.6 |  |
|  | 1000/6 | 11.2 |  |
|  | 1150/6 | 7.1 |  |
|  | 1200/6 | 5.6 |  |
|  | 1150/4 | 9.2 |  |
|  | 1200/4 | 5.9 |  |
|  | 1200/4 | 7.5 |  |
|  | 1250/4 | 5.0 |  |
|  | 1250/4 | 4.7 |  |
| spinel rods | 1000/6 | 34.2 |  |
|  | 1150/4 | 23.2 |  |
|  | 1150/4 | 24.1 |  |
|  | 1200/4 | 22.2 |  |
|  | 1200/4 | 22.9 |  |
|  | 1250/4 | 17.2 |  |
|  | 1250/4 | 19.2 |  |
| Example 4 |  |  |  |
| honeycomb | 1000/4 | 22.8 |  |
|  | 1100/4 | 13.8 |  |
|  | 1150/4 | 6.9 |  |
|  | 1200/4 | 4.0 |  |
|  | 1250/4 | 1.4 |  |
| alumina/ silica rods | 1000/4 | 94.6 |  |
|  | 1100/4 | 75.0 |  |
|  | 1150/4 | 64.4 |  |
|  | 1200/4 | 52.1 |  |
|  | 1250/4 | 31.8 |  |

We claim:

1. A method of producing a monolithic catalyst support having a first substantially continuous high-strength ceramic matrix phase and a second, discontinuous, catalyst-support phase of high surface area porous oxide embedded therein, comprising:

(a) providing multiple matrix bodies comprising a mixture of a sinterable ceramic and a plasticizing-/bonding agent for the ceramic;
   (b) providing multiple support bodies comprising a mixture of (i) a high surface area porous oxide having a surface area of at least 20 m²/g selected from the group consisting of alumina, silica, spinel, titania, zirconia, zeolite, and mixtures of these, and (ii) a plasticizing/binding agent for the oxide;
   (c) intermingling the matrix bodies and support bodies to form a composite thereof wherein the ratio of matrix bodies to support bodies is at least 1.3:1 and wherein the support bodies are substantially uniformly distributed through the composite;
   (d) passing the composite body through a die to form a desired shape thereof; and
   (e) heating the shape to sinter the ceramic material therein.

2. A method of claim 1 in which the ceramic is selected from the group consisting of cordierite, mullite, clay, talc, zirconia, zirconia-spincel, alumina, silica, lithium aluminosilicates, alumina-zirconia, and mixtures of these.

3. A method of claim 2 in which the ceramic is pre-reacted cordierite or mullite and the porous oxide is a spinel, a transition alumina, or a mixture of alumina and silica.

4. A method of claim 3 in which the ceramic is pre-reacted cordierite and the porous oxide is a spinel.

5. A method of claim 3 in which the ceramic is pre-reacted cordierite and the porous oxide is a mixture of alumina and silica.

6. A method of claim 3 in which the porous oxide contains up to about 20% by weight, based on the weight of the porous oxide, of a rare earth oxide.

7. A method of claim 4 in which the porous oxide contains up to about 20% by weight, based on the weight of the porous oxide, of a rare earth oxide.

8. A method of claim 5 in which the porous oxide contains up to about 20% by weight, based on the weight of the porous oxide, of a rare earth oxide.

9. A method of claim 1, 2, 3, 4, 5, 6, 7, or 8 in which the matrix bodies and support bodies are elongate in shape and in which step (c) includes intermingling the bodies longitudinally wherein the ratio of matrix bodies to support bodies is at least 1.5:1.

10. A method of claim 9 in which the elongate matrix bodies are in the form of rods having a substantially circular cross-section with a diameter of about 0.25–09.5 inch and in which the elongate support bodies are in the form of rods having substantially circular cross-section with a diameter of about 0.06–0.1 inch.

11. A method of claim 9 in which the elongate matrix and support bodies are in the form of rods having a substantially hexagonal cross-section with 0.15–0.4 inch sides.

12. A monolithic catalyst support prepared by the method of claim 1, 2, 3, 4, 5, 6, 7 or 8.

13. A monolithic catalyst support prepared by the method of claim 9.

14. A monolithic catalyst support prepared by the method of claim 10.

15. A monolithic catalyst support preparted by the method of claim 11.

16. A monolithic catalyst support comprising a first substantially continuous ceramic matrix phase and a second, discontinuous, discrete, high surface area support phase embedded therein wherein the matrix phase is 60–90 percent by weight of the monolith and the high surface area phase is 10–40 percent by weight of the monolith and has a surface area of at least 20 mm$^2$/g and comprises alumina, silica, spinel, titania, zirconia, zeolite, or mixtures of these.

17. A monolithic catalyst support of claim 16 wherein the ceramic matrix phase comprises cordierite, mullite, clay, talc, zirconia, zirconia-spinel, alumina, silica, lithium aluminosilicate, alumina-zirconia, or mixtures of these.

18. A support of claim 17 wherein the ceramic is cordierite.

19. A support of claim 18 wherein the high surface area phase is a transition alumina.

20. A support of claim 18 wherein the high surface area phase is a spinel.

21. A support of claim 18 wherein the high surface area phase is a mixture of alumina and silica.

* * * * *

UNITED STATES PATENT AND TRADEMARK OFFICE
CERTIFICATE OF CORRECTION

PATENT NO. : 4,631,268
DATED : 12/23/86
INVENTOR(S) : P. Bardhan-I. M. Lachman-L. A. Nordlie It is certified that error appears in the above-identified patent and that said Letters Patent is hereby corrected as shown below:

Claim 2, line 3, delete "zirconia-spincel" and insert
-- zirconia-spinel --.

Claim 15, line 1, delete "preparted" and insert
-- prepared --.

Signed and Sealed this

Twenty-first Day of April, 1987

*Attest:*

DONALD J. QUIGG

*Attesting Officer*   *Commissioner of Patents and Trademarks*